United States Patent [19]

Cheung et al.

[11] Patent Number: 5,173,794
[45] Date of Patent: Dec. 22, 1992

[54] WAVELENGTH DIVISION MULTIPLEXING USING A TUNABLE ACOUSTO-OPTIC FILTER

[75] Inventors: Kwok-Wai Cheung, Rockaway; Michael M. Choy, Westfield, both of N.J.

[73] Assignee: Bell Communications Research, Inc., Livingston, N.J.

[21] Appl. No.: 324,184

[22] Filed: Mar. 16, 1989

[51] Int. Cl.$^5$ .................................... H04J 14/02
[52] U.S. Cl. .................................. 359/127; 359/133
[58] Field of Search ............... 370/3, 1; 455/617, 619, 455/610, 612

[56] References Cited

U.S. PATENT DOCUMENTS

| | | | |
|---|---|---|---|
| 4,726,644 | 2/1988 | Mathis | 370/3 |
| 4,742,576 | 5/1988 | McMahon | 370/3 |
| 4,792,999 | 12/1988 | Stillwell | 370/3 |
| 4,807,227 | 2/1989 | Fujiwara | 370/3 |
| 4,873,681 | 10/1989 | Arthurs | 370/3 |

FOREIGN PATENT DOCUMENTS 2043240 10/1980 United Kingdom .................... 370/3

OTHER PUBLICATIONS

Y. Shimazu et al., "Wavelength-Division-Multiplexing Optical Switch Using Acoustooptic Deflector," *Journal of Lightwave Technology*, 1987, vol. LT-5, pp. 1742-1747.
IBM Tech Disclosure, vol. 30 #9, Feb. 1988 pp. 262-267 "Wavelength Division Multi Access Network Using Component Centralization, L. O. Injection Locking and Homodyne Detection".
"Review and Status of Wavelength-Division-Multiplexing Technology and its Application", *J. Lightwave Technology*, H. Ishio et al., 1984, vol. LT-2, No. 4, pp. 448-463.
"Wavelength-Division Multi Demultiplexers for Two-Channel Single-Mode Transmission Systems", *J. Lightwave Technology*, A. Reichelt et al., 1984, vol. LT-2, No. 5, pp. 675-681.
"Demonstration of High Capacity in the Lambdanet Architecture: A Multiwavelength Optical Network", *Electronics Letters*, H. Kobrinski et al., 1987, vol. 23, No. 16, pp. 824-826.
"Ten-Channel Coherent Optical Fibre Transmission", *Electronics Letters*, E.-J. Bachus et al., 1986, vol. 22, No. 19, pp. 1002-1003.
"State-of-Art Survey of Multimode Fiber Optic Wavelength Division Multiplexing", *Proceedings of the SPIE Conference*, 1983, vol. 403, pp. 117·130.
"Wavelength Controllability of VPE Grown 1.3 μm DFB Lasers for Wavelength Multiplexing Optical Fiber Communication", *Technical Digest*, IOOC--ECOC '85, H. Okuda et al., 1985, vol. 1, pp. 29-32.
"Electronic Wavelength Tuning Using Acoustooptic Tunable Filter with Broad Continuous Tuning Range and Narrow Channel Spacing", *IEEE Photonics Technology Letters*, K. W. Cheung et al., 1989, vol. 1, No. 2, pp. 38-40.
"Acousto-Optic Tunable Filter", *J. Optical Society of America*, S. E. Harris and R. W. Wallace, 1969, vol. 59, No. 6, pp. 744-747.
"Integrated-Optic Acoustically Tunable Infra-Red Optical Filter", *Electronics Letters*, B. L. Heffner et al., 1988, vol. 24, No. 25, pp. 1562-1563.
"Multiple Channel Opteration of an Integrated AO Tunable Filter", 1989 Optical Fiber Communication Conference in the 1989 *Technical Digest Series*, Abstract THB3, K. W. Cheung et al., 1989, vol. 5, p. 136.
"Applications of Coherent Optical Communication in the Network Environment", *Coherent Technology in Fiber Optic Systems*, SPIE, H. Kobrinski, 1985, vol. 568, pp. 42-49.

Primary Examiner—Edward L. Coles, Sr.
Assistant Examiner—L. VanBeek
Attorney, Agent, or Firm—Leonard Charles Suchyta; Charles S. Guenzer

[57] ABSTRACT

A fiber-optic communication system in which two or more lasers of different wavelengths are modulated with respective data signals. The laser outputs are coupled to a common optical fiber. A receiving station receives all the signals on the optical fiber. A tunable acousto-optical filter in the receiving station is electrically tuned to the laser frequency carrying the desired data signal and passes only the optical signal with that frequency to an optical detector.

2 Claims, 3 Drawing Sheets

WAVELENGTH DIVISION MULTIPLEXING USING A TUNABLE ACOUSTO-OPTIC FILTER

FIELD OF THE INVENTION

The invention relates generally to communication systems. In particular the invention relates to optical wavelength-division multiplexing systems.

BACKGROUND OF THE INVENTION

Land-based communication systems increasingly use optical fibers as the transmission medium. One important reason is the wide bandwidth provided by optical fibers. The simplest fiber optic systems use a single laser and a single photodetector at opposite ends of the fiber. The laser is modulated by the data signal and the photodetector detects the data-modulated envelope of the laser carrier frequency. That is, the optical fiber is being used for single-carrier transmission. However, the electronics for the transmitters and receivers are generally limited to frequencies of a few gigahertz and below. While gigabit per second data rates are significant improvements over rates available by coaxial systems or radio-broadcast systems, such single-carrier transmission does not fully utilize the bandwidth of the fiber, often the most expensive component of a long-haul communication system.

Fiber optics also are finding use in local-area networks (LANs) and local distribution systems. One of the problems of such systems has been the difficulty of switching an optical-carrier signal between the sender and a selected receiver.

As a result of the limitations of single-carrier fiber optic communications systems, many proposals have been made for wavelength-division-multiplexing systems, as has been described by Ishio et al in a technical article entitled "Review and Status of Wavelength-Division-Multiplexing Technology and Its Application" appearing in Journal of Lightwave Technology, Vol. LT-2, 1984 at pages 448–463. A fundamental configuration for such a system is illustrated in FIG. 1 in which a transmission end 10 is linked to a receiving end 12 by an optical fiber 14. There are n channels of electronic inputs $CH_1$ to $CH_n$, each controlling a modulator 16 modulating a photoemitter 18, such as a laser diode. Each of the photoemitters 18 is emitting light at a frequency different from the other photoemitters 18. The different wavelengths of light from the n photoemitters 18 are combined in an optical multiplexer 20. The optical fiber receives the optical output of the multiplexer 20 and provides an optical input to an optical demultiplexer 22. The demultiplexer 22 separates its input into n optical outputs corresponding in frequency or wavelength to the photoemitters 18. The so separated light is detected by photodetectors 24, which may be broad band, and the electronic outputs are demodulated by receivers 26 into the n channels of received data. The demultiplexer is a generalized optical filter.

It is possible to use a single fiber 14 for bidirectional transmission as is explained both by Ishio et al and by Reichelt et al in a technical article entitled "Wavelength-Division Multi Demultiplexers for Two-Channel Single-Mode Transmission Systems" appearing in Journal of Lightwave Technology, Vol. LT-2, 1984 at pages 675–681.

A related system provides a passive hub for communications between n user stations. One such system is the LAMBDANET system described by Kobrinski in a technical article entitled "Applications of coherent optical communication in the network environment" appearing in Coherent Technology in Fiber Optic Systems, SPIE, Vol. 568, 1985 at pages 42–49 and by Kobrinski et al in a technical article entitled "Demonstration of high capacity in the LAMBDANET architecture: A multiwavelength optical network" appearing in Electronics Letters, Vol. 23, No. 16, 1987 at pages 824–826. As illustrated in FIG. 2, there are n nodes 30, each linked to an n x n star coupler 32 by an transmission optical fiber 34 and by a receiver optical fiber 36. Each node 30 transmits digital data modulated on an optical carrier having a different optical carrier frequency $f_1$, $f_2$ through $f_n$. The frequencies are determined by different photoemitters 18 in each of the nodes 30. The star coupler 32 may be a passive device which consumes no electrical power and merely combines all its optical inputs into equivalent parallel outputs so that all the receiver fibers 36 carry all the optical signals from all the nodes 30.

The system described by Kobrinski et al relies on a diffraction grating for the demultiplexer. There were n optical fibers receiving the spectrally separated outputs of the diffraction grating and each working fiber had associated therewith a photodetector. The described system had a channel spacing of 2 nm. The diffraction grating optically filters the input signal to different angular positions dependent upon the carrier wavelength. The diffraction grating demultiplexer has the problem of relying on the physical arrangement of the fibers relative to the grating. The wavelengths of the transmitters are fixed relative to the receivers. Further, as the emitting lasers age, their frequencies change. Therefore, the fibers need to be moved relative to the grating if they are to stay tuned to the laser frequencies. There must be n receivers for n channels if frequent channel hopping is expected. If mechanical tuning is provided, there are severe reproducibility problems.

The two above described LAMBDANET systems rely on direct detection of the optical signal within the nodes 30, for example, a diffraction grating demultiplexer followed by photosensitive transistors. However, the LAMBDANET system can be modified to incorporate coherent detection based on optical heterodyning to select the desired channel, that is, the optical carrier frequency $f_i$ corresponding to the desired transmitting node 30. Optical heterodyning has been described in a technical article by Bachus et al entitled "Ten-channel coherent optical fibre transmission" appearing in Electronics Letters, Vol. 22, No. 19, 1986 at pages 1002 and 1003. A simplified coherent detection system is shown in FIG. 2. A tunable laser 38 emits a continuous beam at an optical local oscillator frequency $f_{LO}$. An optical combiner 40 combines the optical signal received on the receiver fiber 36 and that received from the local oscillator 38. By proper tuning of the local oscillator frequency $f_{LO}$, the difference frequency $f_i - f_{LO}$ of the desired channel is brought within the frequency range of a detector 42 which is a low pass optical filter and a square law converter. The data signal carried by the selected carrier at frequency $f_i$ can thereafter be IF demodulated by the electronics 44.

The optical heterodyning of Bachus et al allows for very narrow channel spacing; 6 GHz or 0.013 nm was demonstrated. However, optical heterodyning requires a narrow-band, continuously tunable laser for the local oscillator 38. Bachus states that the laser must be stabilized in temperature to 0.001° C. and in current to 1 µA. In order to suppress phase noise, the laser linewidth must be very narrow. Needless to say, these requirements put severe demands on the design of the local oscillator laser.

As has been explained by Spencer in his review article on WDM systems entitled "State-of-the-art survey of multimode fiber optic wavelength division multiplexing" appearing in Proceedings of the SPIE, vol. 403, 1983 at pages 117–130, the demultiplexer presents one of the major technical challenges if the communication system is to carry a significant number of channels. Many of the demultiplexers described by Ishio et al and by Spencer are complex, as is the demultiplexer of the Bachus et al system. Except for the optical heterodyning, the number of channels is severely limited. Spencer teaches that few systems use optical filters as the wavelength discriminating device but they are instead used more for the purpose of improving signal to noise. The two main types of filters disclosed by Spencer in association with wavelength discrimination are interference filters and high or low pass dichroic filters.

One of the major drawbacks of the demultiplexers described by Spencer, by Kobrinski et al, and by Ishio et al is that the demultiplexed frequencies are physically fixed by the structure or at least the configuration of the demultiplexer. Tunability is mostly discussed in conjunction with angular changes in physical optics. It thus becomes very difficult to build one demultiplexer which can be tuned to different frequencies. Such a tunability would allow detection of different ones of the data channels. When tuning is achieved by physical movement of the diffraction grating or fibers, the tuning is necessarily slow. Furthermore, there is an inevitable amount of backlash in mechanically adjustable opital components, which reduces the accuracy of the optical tuning.

The tunable optical filters of the prior art offer different advantages and disadvantages, as discussed below.

The Fabry-Perot or tunable etalon type of filter is desirable in that it is not dependent upon the polarization of the light and has a relatively low insertion loss of 2 to 3 dB. Its finesse of 40 to 100 is acceptable. However, its mechanical tuning is slow and its repeatability of tuning is very poor. This type of filter can be cascaded into two stages. The finesse is then increased to about 1000 but the insertion loss is raised to above 10 dB. The mechanical tuning then becomes slower and more difficult to control.

An electro-optic type of optical filter relies on electronic tuning so that channel hopping can be done on the order of nanoseconds. The tuning range of about 10 nm is not very good but the repeatability and fine tunability are acceptable. The insertion loss of 4 to 6 dB is marginal. The biggest disadvantages of electro-optic filters are the small finesse of about 10 and the polarization dependency.

Semiconductor optical filters of the injection current type also provide nanosecond electronic tuning. Their channel spacing of about 0.6 nm is fairly narrow but the tuning range of about 4 nm is not very useful. They are repeatably tunable and offer fine tunability. However, they provide very small values of finesse, are polarization dependent and present large insertion losses of over 10 dB.

SUMMARY OF THE INVENTION

Accordingly, an object of the invention is to provide an optical filter which can separate narrowly spaced channels.

Another object of the invention is to provide an optical filter which can be tuned to different wavelength bands quickly and without mechanical adjustments.

A yet further object of the invention is to provide an optical demultiplexer which does not require optical heterodyning.

A still further object of the invention is to provide a fiber optic communication system utilizing such a demultiplexer to achieve wavelength-division multiplexing of a large number of channels on one optical fiber.

The invention can be summarized as a wavelength-division-multiplexing optical communication system in which the demultiplexer is a tunable acousto-optical filter. The optical pass band of the acousto-optical filter is controlled by the RF frequency of the electronic control of the filter.

DETAILED DESCRIPTION

Figure 1:
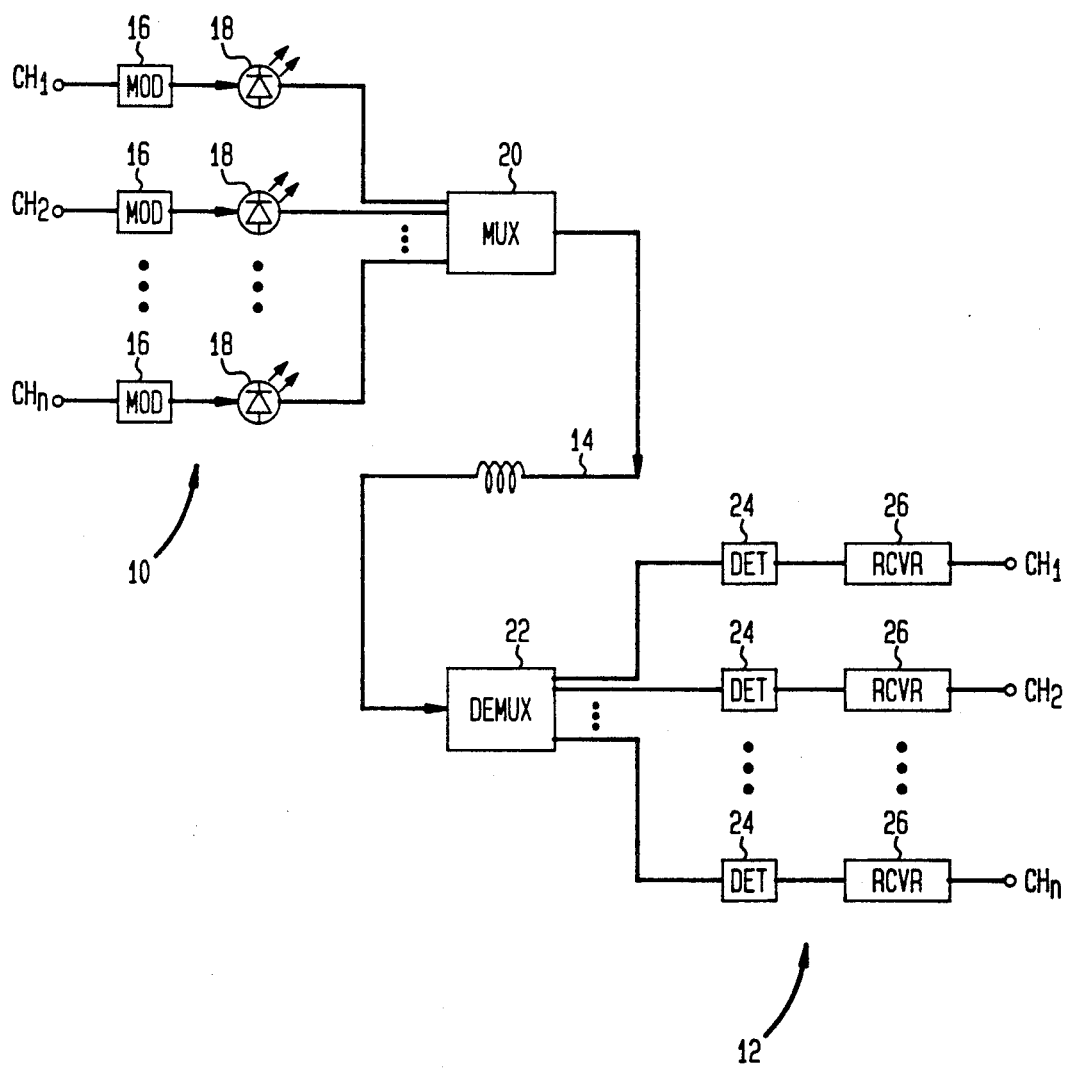
FIG. 1 is a block diagram of a prior art wavelength-division-multiplexing fiber optic communication system.
Figure 3:
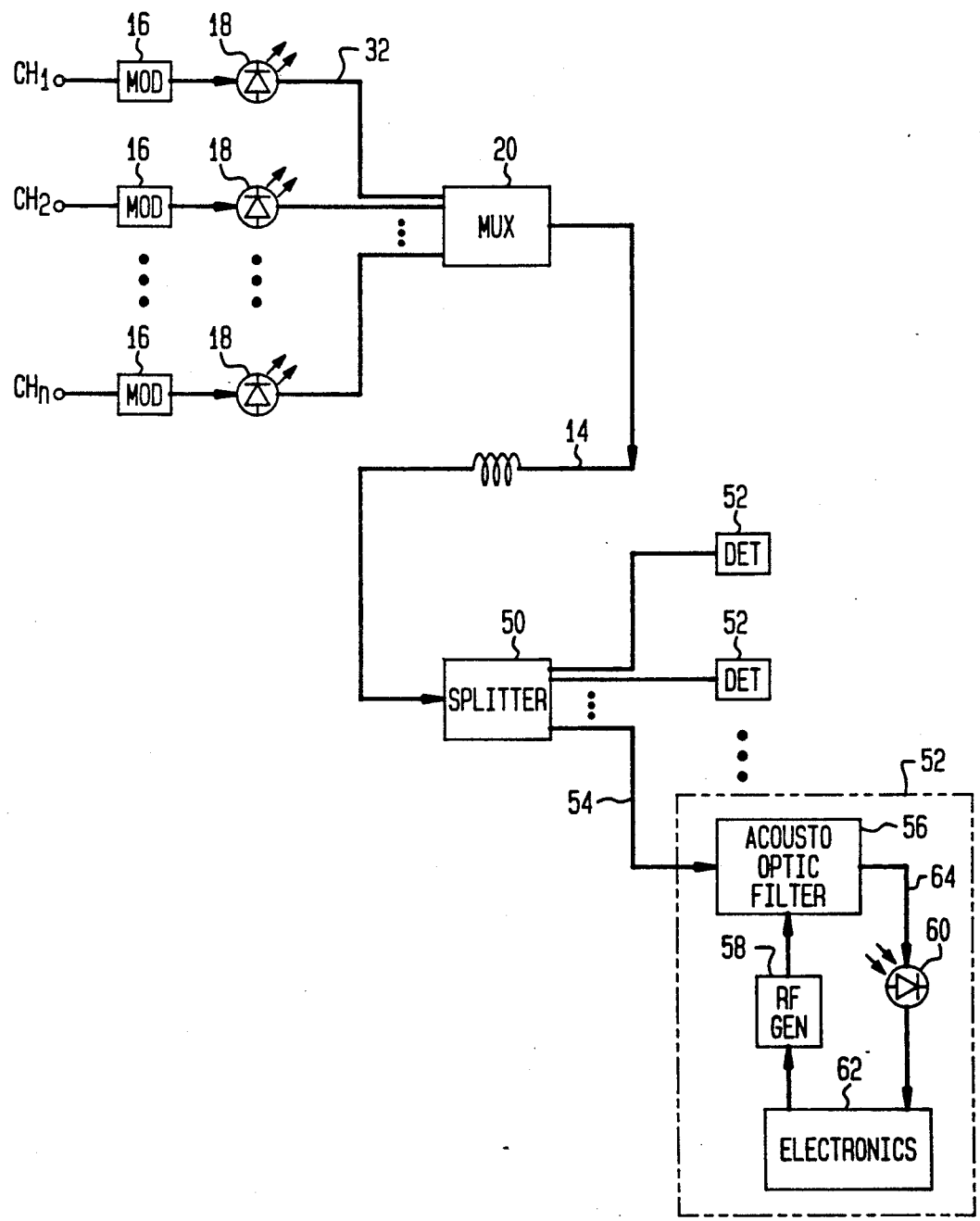
FIG. 3 is a block diagram of a wavelength-division-multiplexing fiber optic communication system in which the present invention can be used.

The present invention uses an acousto-optic filter as a tunable optical filter in the demultiplexer in a fiber optic, wave division multiplexing (WDM) communication system. An example of such an WDM system is shown in FIG. 3. At a central office of a telephone company, n channels $CH_1$ through $CH_n$ of information control separate electronic modulators 16 which drive separate laser diodes 18. Each of the laser diodes 18 emits at a different wavelength. Light from the laser diodes 18 is combined by a multiplexer 20 onto a single optical fiber 14 so that the n channels $CH_1$ through $CH_n$ are wave-division multiplexed on the optical fiber 14. The components described so far do not differ fundamentally from those described in relation to the prior art of FIG. 1. The laser diodes 18 may be distributed feedback (DFB) lasers such as the type described by Okuda et al in a technical article entitled "Wavelength controllability of VPE grown 1.3 µm DFB lasers for wavelength multiplexing optical fiber communication" appearing in Technical digest, IOOC-ECOC '85, Venezia, 1985, Vol. 1 at pages 29–32. These lasers may be fine tuned by their temperature stabilization level. They may be modulated at data rates of 1 Gb/s and higher and produce output powers of up to 0 dBm.

The multiplexer 20 may be a diffraction grating receiving the optical beams from the n laser diodes 18 fixed at respective angular positions. However, as described in a technical article by Cheung et al, entitled "Electronic Wavelength Tuning Using Acousto-optic Tunable Filter with Continuous Tuning Range and Narrow Channel Spacing," appearing in IEEE Photonics Technology Letters, Vol. 1, 1989 at pages 38–40, we tested a system in which the diode outputs were immediately coupled into respective optical fibers 32. Unillustrated polarization controllers were attached to each of the fibers which were then connected to respective fiber inputs of a 16×16 star coupler, such as is available from Gould, Inc., which was used as the multiplexer 20. A single output of the star coupler was connected to many kilometers of optical fiber 14. The fiber 14 thus carried WDM signals from all the input channels $CH_1$ through $CH_n$.

This WDM signal is then split by an optical multiple splitter 50 to provide identical signals to m nodes 52. The splitter 50 may again be a star coupler, the outputs of which are connected to the nodes 52 by node optical fibers 54. However, because the optical WDM signal on the long fiber 14 is divided among the m node fibers 38, it may be necessary to additionally include optical amplifiers on the node fibers 38. If the signal on the long fiber 14 is relatively weak, as would be the case in a long-haul communication system, then optical amplification would likely be needed. The previously described optical heterodyning could alternatively be used to provide instead better sensitivity for detection. However, if the communication system involves only short distances, such as a local area network, then the relatively large optical signal can be split to several nodes without added amplification.

In each of the m nodes 52, the WDM optical signal is coupled out of the node fiber 54, collimated and passed through an acousto-optic tunable filter 56. Tunable acousto-optic filters have been described by Harris et al in a technical article entitled "Acousto-Optic Tunable Filter" appearing in Journal of the Optical Society of America, Vol. 59, 1969 at pages 744-747. The Harris filter was a collinear filter relying on TE- to TM-mode conversion. In an alternative non-collinear filter, an RF generator 58 excites an acoustic wave in the filter 56. The frequency of the electrical signal from the RF generator 58 changes the acoustic wave frequency which in turn changes the band of optical frequencies which the filter 56 will diffract out of the main optical beam and thus pass at a non-collinear angle.

The filtered optical output is then detected by a photodetector 60 and the resultant electrical signal is input to an electronic circuit 62. The RF frequency is chosen such that the acousto-optic filter 56 passes only the optical carrier frequency associated with a selected one of the n laser diodes 18. Therefore, the electrical output of the photodetector 60 will be the selected one of the n channels $CH_1$ to $CH_n$.

The acousto-optical filter has the further advantage that it is a band-pass filter excited by a sinusoidal RF signal. It thus becomes possible for the filter to pass multiple, contiguous or noncontiguous optical bands. For this use, the RF generator 58 is designed to simultaneously generate two or more RF signals at different selected frequencies. The RF signals are combined before being applied to the acousto-optical filter 56. The filter 56 passes whatever optical carriers have optical frequencies corresponding to any of the RF signals.

In one illustrative embodiment of the system, the acousto-optic filter was a $TeO_2$ non-collinear acousto-optic filter, Model EFL-F20R6A, available from INRAD, Inc. of Northvale, N.J. This acousto-optic filter had an optical tuning range of 1.2 to 1.6 $\mu$m, a resolution of 3.3 nm, an access time of 3 $\mu$s, an aperture of 2 mm×5 mm, a transducer length of 10 mm and a transducer area of 2 mm×10 mm. The $TeO_2$ filter could be driven in the range of 50 to 80 MHz (70 MHz corresponded to a 1.3 $\mu$m optical pass band and 58 MHz corresponded to a 1.56 $\mu$m pass band) with a maximum RF power of 3 W. However, collinear integrated $LiNbO_3$ acousto-optic filters have been developed in which only the waveguide and not the entire substrate is excited and which are expected to reduce the RF power to 100 mW. Such an integrated acoustooptic filter is described by Heffner et al in a technical letter entitled "Integrated-Optic Acoustically Tunable Infra-red Optical Filter," appearing in Electronics Letters, Vol. 24, 1988 at pages 1562 and 1563. In the case of an integrated filter, an optical fiber is pig-tailed to the integrated filter and the node fiber 54 is then detachably coupled to the pig-tail fiber. Cheung et al have publicized the use of the integrated filter in a WDM in an abstract entitled "Channel Operation of an Integrated AO Tunable Filter" at the 1989 Optical Fiber Communication Conference, February 6-9, 1989, Houston, Texas, Abstract THB3, page 136 in the 1989 Technical Digest Series, Vol. 5.

In this embodiment, the photodetector 60 was part of a PIN-FET receiver, including equalization circuits and the like, coupled to the end of a single-mode optical fiber 64. However, the nature of the electronic circuit 62 depends upon the nature of the application. If the node 52 is a home, the electronic circuit 62 would contain further demodulators or demultiplexers for telephones, television cable services and other video-text services. The invention is particularly advantageous in the case of television cable services being simultaneously delivered to a large number of home in that the cable channels are automatically delivered to all homes. This concept is referred to as broad-band ISDN (integrated services digital network), which would provide a large number of channels for multi-channel television and wide-band electronic services. The selection of the cable channels is performed at the home by the tuning of the acousto-optic filter 56.

The electronic circuit 62 may contain control over the RF frequency of the RF generator 42 in order to dynamically switch between the channels $CH_1$ to $CH_n$. The demonstrated switching time of 3 $\mu$s shows that any of the channels can be selected at will for nearly instant access. The switching time of the acousto-optic filter 56 is fast enough that the communication system could be used for computer data channels. It is also fast enough that a time-multiplexed format may be used so that multiple channels may be concurrently received, e.g., a control channel, a telephone channel, and a television channel. Of course, the use of multiple RF frequencies can be used for multiple channels although a further means is then required to separate the multiple passed channels.

Figure 2:
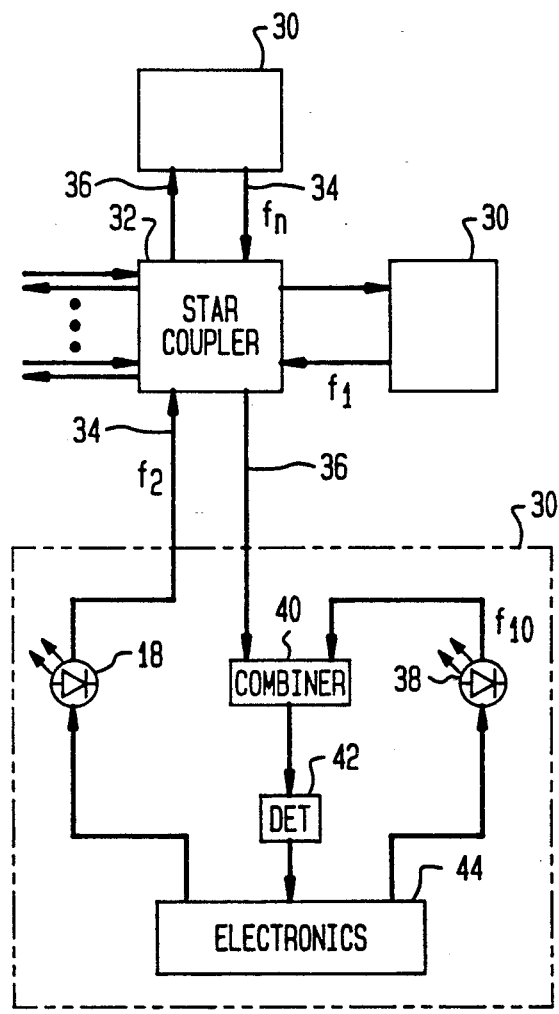
FIG. 2 is a block diagram of another prior art wavelength-division-multiplexing system.

The invention can also be applied to the LAMBDA-NET system of FIG. 2. Referring to FIG. 3, in a LAMBDANET system, the multiplexer 20 and the multiple splitter 50 are combined into a single star coupler. Each of the LAMBDANET nodes 30 then contains one tunable acousto-optic filter 56 and a laser diode 18 with a fixed optical carrier frequency different from those of the other nodes 30.

The closest channel spacings possible with an acousto-optic filter depend, upon other things, upon the characteristics of the filter. A typical acousto-optic filter has transmission characteristics with a main peak around the optical frequency to which it is tuned and side lobes around that peak. We have placed the channel spacing such that an adjacent channel falls into the first minimum, that is, between the main peak and the first side lobe. We have thereby achieved channel spacings of 1.3 nm. However, if multiple RF signals are used to simultaneously select multiple optical signals, coherent interference between channels becomes a more serious difficulty. In this case, we have maintained adequately low error rates by placing the neighboring channel in the second minimum, that is, at 2.6 nm spacings.

Rather than providing all the channels in one region of the optical spectrum, multiple channels may be placed in advantageous but disjunct regions. For instance, in silica optical fibers it is well known that the 1.3 $\mu$m region offers zero dispersion while the 1.5 $\mu$m band offers the minimum loss. The 0.8 $\mu$m band is satisfactory for short-distance local area networks. Depending upon the requirements of the channels, one or more channels may be placed in each of these bands. Nonetheless, an acousto-optic filter can be designed which can filter and separate channels in all these bands. With such a design, up to a hundred WDM channels can be placed on a single fiber.

Nonetheless, the WDM system based on acousto-optical filters offers advantages not previously found. The channel tuning can be done completely electronically without fear of mechanical backlash. Switching times are fast enough to provide new types of multi-channel services. Laser aging effects can be easily compensated. Perhaps, optical heterodyning provides more channels, but at the disadvantage of expensive and fragile continuously tunable lasers for the local oscillators. The tunable range of acousto-optical filters easily spans the important optical frequencies between 0.8 and 1.5 $\mu$m.

Compared to the optical filters discussed in detail before, acousto-optical filters have several advantages as well as some drawbacks. They have a broad tuning range of about 400 nm, the tuning is repeatable and fine tuning is possible. Both the bulk and the integrated types offer good speed of channel hopping in the microsecond range. The insertion loss for the bulk acousto-optical filter is low, about 2 to 5 dB. For the integrated acousto-optical filter, the insertion loss is increased to 4 to 6 dB. The bulk acousto-optical filter has a good finesse of above 100. The finesse is increased to about 400 for the integrated filter. The channel spacing is relatively poor for the bulk filter, approximately 4 nm, but becomes better for the integrated filter, about 1 nm. The bulk filter requires substantial RF power to drive it but the integrated filter removes this problem. Both types of filters in their present form are disadvantageous in being polarization dependent although this polarization limitation is not inherent.

What is claimed is:

1. A communication system, comprising:
   a plurality of light emitting sources emitting light at respective ones of a plurality of optical wavelengths;
   a plurality of data sources impressing data signals upon respective ones of said light emitting sources;
   at least one optical fiber receiving said light emitted from all of said plurality of light emitting sources to form a combined optical signal; and
   at least one receiving station receiving said combined optical signal from said at least one optical fiber, said receiving station comprising
   a tunable acousto-optical filter performing conversion between TE and TM modes in an optical beam containing said combined optical signal and passing at least two selected wavelength components of said combined optical signal,
   an electrical generator simultaneously driving said acousto-optical filter at a plurality of selected electrical frequencies, said filter thereby passing a plurality of selected wavelength components of said combined optical signal, wherein said wavelength components are selected by said selected electrical frequencies in correspondence to selected ones of said data sources and
   an optical detector receiving said selected wavelength components.

2. A communication system as recited in claim 1, comprising a structure integrated on a substrate and comprising both said acousto-optical filter and an optical waveguide receiving said combined optical signal.

* * * * *